(12) United States Patent
Huang (10) Patent No.: US 11,281,043 B2
(45) Date of Patent: Mar. 22, 2022

(54) DISPLAY PANEL AND DISPLAY APPARATUS (71) Applicant: HKC CORPORATION LIMITED, Shenzhen (CN)

(72) Inventor: Beizhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 591 days.

(21) Appl. No.: 16/319,357

(22) PCT Filed: Nov. 19, 2018

(86) PCT No.: PCT/CN2018/116139
§ 371 (c)(1),
(2) Date: Jan. 21, 2019

(87) PCT Pub. No.: WO2020/052066
PCT Pub. Date: Mar. 19, 2020

(65) Prior Publication Data
US 2021/0333617 A1  Oct. 28, 2021

(30) Foreign Application Priority Data
Sep. 13, 2018 (CN) .......................... 201821513680.7

(51) Int. Cl.
*G02F 1/1335* (2006.01)
(52) U.S. Cl.
CPC .. *G02F 1/133512* (2013.01); *G02F 1/133514* (2013.01)

(58) Field of Classification Search
CPC ..................... G02F 1/133512; G02F 1/133514
See application file for complete search history.

(56) References Cited

FOREIGN PATENT DOCUMENTS

| CN | 101661204 | A |   | 3/2010 |
|---|---|---|---|---|
| CN | 102681246 | A |   | 9/2012 |
| CN | 104375313 | A |   | 2/2015 |
| CN | 105319631 | A |   | 2/2016 |
| CN | 108227273 | A | * | 6/2018 |
| CN | 108227273 | A |   | 6/2018 |
| JP | 0895024 | A |   | 4/1996 |

OTHER PUBLICATIONS

Machine translation of CN 108227273 (Year: 2018).*
Qingna Li, the ISA witten comments, dated May 2019, CN.

* cited by examiner

*Primary Examiner* — Anne M Hines (57) ABSTRACT

The present application discloses a display panel and a display apparatus. The display panel includes a first substrate; the first substrate includes: a base and a black shading layer, where the black shading layer is located on the base, and the black shading layer includes a plurality of black matrixes; a color photoresist layer, located on the black shading layer; and a transparent conductive film, located on the color photoresist layer; the color photoresist layer includes a plurality of color filters; and the color filters at least include a first color filter and a second color filter that are stacked partially.

16 Claims, 4 Drawing Sheets

DISPLAY PANEL AND DISPLAY APPARATUS

The present application claims priority to the Chinese Patent Application No. CN201821513680.7, filed with the Chinese Patent Office on Sep. 13, 2018, and entitled "DISPLAY PANEL AND DISPLAY APPARATUS", which is incorporated herein by reference in its entirety.

TECHNICAL FIELD

The present application relates to the technical field of display, and in particular to a display panel and a display apparatus.

BACKGROUND

The statements in this section merely provide background information related to the present application and may not constitute prior art.

A Liquid Crystal Display (LCD) has numerous advantages such as a thin body, power saving and no radiation, and thus is widely applied. Most LCDs on a market are backlight type liquid crystal displays and each LCD includes a liquid crystal panel and a backlight module. A working principle of the liquid crystal panel is to place liquid crystal molecules into two parallel glass substrates and apply a drive voltage onto the two glass substrates to control rotation directions of the liquid crystal molecules, thereby refracting light rays of the backlight module to generate a picture.

The liquid crystal panel includes an array substrate, a color film substrate and a liquid crystal layer clamped between the array substrate and the color film substrate; by using a circuit to generate an electric field, the liquid crystal molecules are driven; different optical effects are generated by physical characteristics of liquid crystals; and then, a full-color display image is implemented corresponding to changes of three original colors, i.e., Red Green Blue (RGB), on the color film substrate. The color film substrate is a necessary material for colorization of the liquid crystal panel, and generally includes a base, a black matrix layer, a color photoresist layer and a transparent conductive film.

Among them, for a large-size liquid crystal display panel, when the display panel is manufactured and a transparent conductive film is deposited on color photoresist layers, a line breaking condition of a film electrode is easily occurred, and thus the display of the display panel is poor, and moreover, foreign particles are easily hidden between the color photoresist layers to affect the yield of the liquid crystal panel.

SUMMARY

An object of the present application is to provide a display panel and a display apparatus to reduce a line breaking risk of a transparent conductive film and simultaneously improve the product yield.

To this end, the present application discloses a display panel, which includes a first substrate; the first substrate includes: a base; a black shading layer, located on the base, the black shading layer including a plurality of black matrixes; a color photoresist layer, located on the black shading layer; and a transparent conductive film, located on the color photoresist layer; the color photoresist layer includes a plurality of color filters; and the color filters at least include a first color filter and a second color filter that are stacked partially.

Optionally, the color filters further include a third color filter; an angle of a sharp angle of the first color filter is greater than an angle of a sharp angle of each of the second color filter and the third color filter; each of the sharp angles is an included angle formed by a side of each of the color filters and an upper surface of each of the black matrixes; each of the color filters at least includes a stacked portion; and one stacked portion is stacked on the first color filter by a side portion, close to the first color filter, of the second color filter.

Optionally, a height of the second color filter is greater than a height of the first color filter.

Optionally, the color filters further include a third color filter and a fourth color filter; an angle of a sharp angle of the first color filter is greater than an angle of a sharp angle of each of the second color filter, the third color filter and the fourth color filter; each of the color filters at least includes a stacked portion; and one stacked portion is stacked on the first color filter by a side portion, close to the first color filter, of the second color filter.

Optionally, the sharp angle of the first color filter is greater than or equal to 60°.

Optionally, each of the color filters only includes one stacked portion.

Optionally, each of the color filters includes a plurality of obtuse angles formed into a supplementary angle with each of the sharp angles; each of the stacked portions is formed at an obtuse angle of which the angle is smaller than or equal to 120°; and each of the obtuse angles is an included angle formed by an upper surface and the side of each of the color filters.

Optionally, a tail portion of the one stacked portion is stretched across an obtuse angle turning place of the first color filter.

Optionally, the color filters include a red color filter, a green color filter and a blue color filter; the first color filter includes any one of the red color filter, the green color filter and the blue color filter; the second color filter includes any one of the red color filter, the green color filter and the blue color filter, and is matched with the first color filter; the third color filter includes any one of the red color filter, the green color filter and the blue color filter, and is matched with the first color filter and the second color filter; and the fourth color filter includes any one of the red color filter, the green color filter and the blue color filter, and is matched with the first color filter, the second color filter and the third color filter.

Optionally, each of the stacked portions is designed via a conventional mask. After a pattern of the first color filter is made, the second color filter is deposited, an opening is provided on the conventional mask, one side of the opening corresponds to the obtuse angle turning place of the first color filter, and the other side of the opening corresponds to a sharp angle turning place, far away from the first color filter, of the second color filter; and after exposure and image developing, the second color filter partially stacked with the first color filter is obtained. With such a design, it may be assured that the first color filter and the second color filter are not affected by stacking, and the stacked portion covers the obtuse angle turning place of the first color filter.

The present application further provides a display panel, which includes a first substrate; the first substrate includes: a base; a black shading layer, located on the base, the black shading layer including a plurality of black matrixes; a color photoresist layer, located on the black shading layer; and a transparent conductive film, located on the color photoresist layer; the color photoresist layer includes a plurality of color filters; the color filters at least include a first color filter and a second color filter that are stacked partially; the color filters further include a third color filter; an angle of a sharp angle of the first color filter is greater than an angle of a sharp angle of each of the second color filter and the third color filter; each of the sharp angles is an included angle formed by a side of each of the color filters and an upper surface of each of the black matrixes; each of the color filters at least includes a stacked portion; one stacked portion is stacked on the first color filter by a side portion, close to the first color filter, of the second color filter, the sharp angle of the first color filter is greater than or equal to 60°; each of the color filters includes a plurality of obtuse angles formed into a supplementary angle with each of the sharp angles; each of the stacked portions is formed at an obtuse angle of which the angle is smaller than or equal to 120°; each of the obtuse angles is an included angle formed by an upper surface and the side of each of the color filters; a tail portion of the one stacked portion is stretched across an obtuse angle turning place of the first color filter; and the tail portion is a side portion, stacked on the first color filter, of the second color filter.

The present application further provides a display apparatus, which includes the above-mentioned display panel and a drive circuit configured to drive the display panel.

It is found by a research of an applicant that after general color filters are exposed, different color filters are not overlapped, and a transparent conductive film is deposited on surfaces of the color filters on a color photoresist layer, when a side slope of each of the color filters is steep, it is very easy for the transparent conductive film at an intersection of an upper surface and a side of each of the color filters to appear a line breaking condition to affect normal display of a display panel; and moreover, adjacent color filters are formed into grooves on black matrixes and some foreign particles are easily hidden in the grooves, thereby affecting the yield of the display panel. In the present application, the first color filter and the second color filter are partially stacked, so that a difference between the first color filter and the second color filter becomes small, and when the transparent conductive film is deposited on the first color filter and the second color filter, the line breaking condition of the transparent conductive film is reduced, and thus the line breaking condition of the transparent conductive film is improved, and the yield of the display panel is increased; and on the other hand, since adjacent color filters are partially overlapped, the formation of a groove is prevented, and thus the presence of the foreign particles is prevented and the yield of the display panel is improved.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying relative importance, or implicitly indicating the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or coupled; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

In the drawings, units having similar structures are indicated by a same numeral.

As shown in FIG. 1 to FIG. 6, the present application provides a display panel, which includes a first substrate 10;

the first substrate 10 includes: a base 20; a black shading layer 30, located on the base 20, the black shading layer 30 including a plurality of black matrixes 31; a color photoresist layer 40, located on the black shading layer 30; and a film conductive layer, located on the color photoresist layer 40; the color photoresist layer 40 includes a plurality of color filters; and the color filters at least include a first color filter 41 and a second color filter 42 that are stacked partially.

Specifically, the first substrate 10 is a color film substrate in general, and may also be an array substrate under a Gate driver On Array (GOA) technology.

In the present application, the first color filter 41 and the second color filter 42 are partially stacked, so that a difference between the first color filter 41 and the second color filter 42 becomes small, and when a transparent conductive film 50 is deposited on the first color filter 41 and the second color filter 42, a line breaking condition of the transparent conductive film 50 is reduced, and thus the line breaking condition of the transparent conductive film 50 is improved, and the yield of the display panel 2 is increased; and on the other hand, since adjacent color filters are partially overlapped, the formation of a groove is prevented, and thus the presence of the foreign particles is prevented and the yield of the display panel 2 is improved.

Specifically, a portion where the first color filter 41 and the second color filter 42 are stacked is located on one black matrix 31. Each of the black matrixes 31 takes a shading effect. Through the portion where the first color filter 41 and the second color filter 42 are stacked, a color of the first color filter 41 or the second color filter 42 may be prevented from being mixed to affect the display effect.

In one or more embodiments, the color filters further include a third color filter 43; an angle of a sharp angle 411 of the first color filter 41 is greater than an angle of a sharp angle 411 of each of the second color filter 42 and the third color filter 43; each of the color filters at least includes a stacked portion 45; and one stacked portion 45 is stacked on the first color filter 41 by a side portion, close to the first color filter 41, of the second color filter 42.

In this solution, as the angle of the sharp angle 411 of the first color filter 41 is greater than the angle of the sharp angle 411 of each of the second color filter 42 and the third color filter 43, it is indicated that a side slope of the first color filter 41 is steeper than a side slope of each of the second color filter 42 and the third color filter 43, and the line breaking condition of the transparent conductive film 50 is more easily occurred at an intersection of an upper surface and a side of the first color filter 41; the side portion, close to the first color filter 41, of the second color filter 42 with the small sharp angle 411 is stacked on the first color filter 41 and covers the side of the first color filter 41, and the difference between the second color filter 42 and the first color filter 41 is small, so the occurrence probability of line breaking when the transparent conductive film 50 is deposited on the color filters is greatly reduced.

Specifically, each of the sharp angles 411 is an included angle formed by a side of each of the color filters and an upper surface of each of the black matrixes 31.

In one or more embodiments, a height of the second color filter 42 is greater than a height of the first color filter 41.

In this solution, the second color filter 42 is close to a side edge of the first color filter 41 and forms a gentle slope on the upper surface of the first color filter 41, so that the difference between the two color filters becomes small. As the side slope of the color filter contacting the transparent conductive film 50 is gentle, the line breaking probability of the transparent conductive film 50 is reduced.

In one or more embodiments, the sharp angle 411 of the first color filter 41 is greater than or equal to 600.

In this solution, it is found by a research that when the sharp angle 411 of each of the color filters is greater than 60°, the line breaking condition of the transparent conductive film 50 is easily occurred. Therefore, the first color filter 41 needs to be partially stacked.

In one or more embodiments, each of the color filters includes a plurality of obtuse angles 412 formed into a supplementary angle with each of the sharp angles 411; and each of the stacked portions 45 is formed at an obtuse angle 412 of which the angle is smaller than or equal to 120°.

In this solution, when each of the sharp angles 411 is greater than or equal to 60°, the transparent conductive film 50 breaks the line easily, and the line breaking place is the obtuse angle 412 of each of the color filters. At this moment, each of the obtuse angles 412 is smaller than or equal to 120°. By providing each of the stacked portions 45 at each of the obtuse angles 412, the drawback at each of the stacked portions 45 may be eliminated, and thus the line breaking probability of the transparent conductive film 50 at each of the obtuse angles 412 is reduced.

Specifically, each of the obtuse angles 412 is an included angle formed by an upper surface and the side of each of the color filters.

In one or more embodiments, a tail portion 451 of the one stacked portion 45 is stretched across an obtuse angle 412 turning place of the first color filter 41.

In this solution, the tail portion 451 of the one stacked portion 45 is the side, stacked on the first color filter 41, of the second color filter 42. The side slope is gentle, and the tail portion 451 is stretched across the obtuse angle 412 turning place of the first color filter 41. By replacing the obtuse angle 412 with a gentle slope surface, the transparent conductive film 50 does not contact the obtuse angle 412 turning place of the first color filter 41 during deposition but is deposited on the gentle side of the second color filter 42.

Specifically, the tail portion 451 is a side portion, stacked on the first color filter 41, of the second color filter 42.

Figure 1:
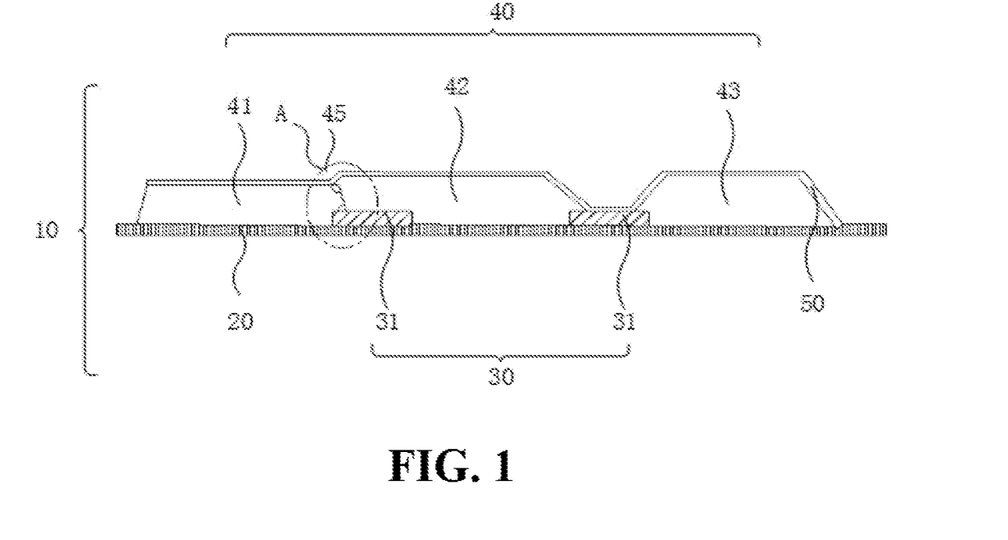
FIG. 1 is a schematic diagram (1) of a display panel according to the present application.
Figure 2:
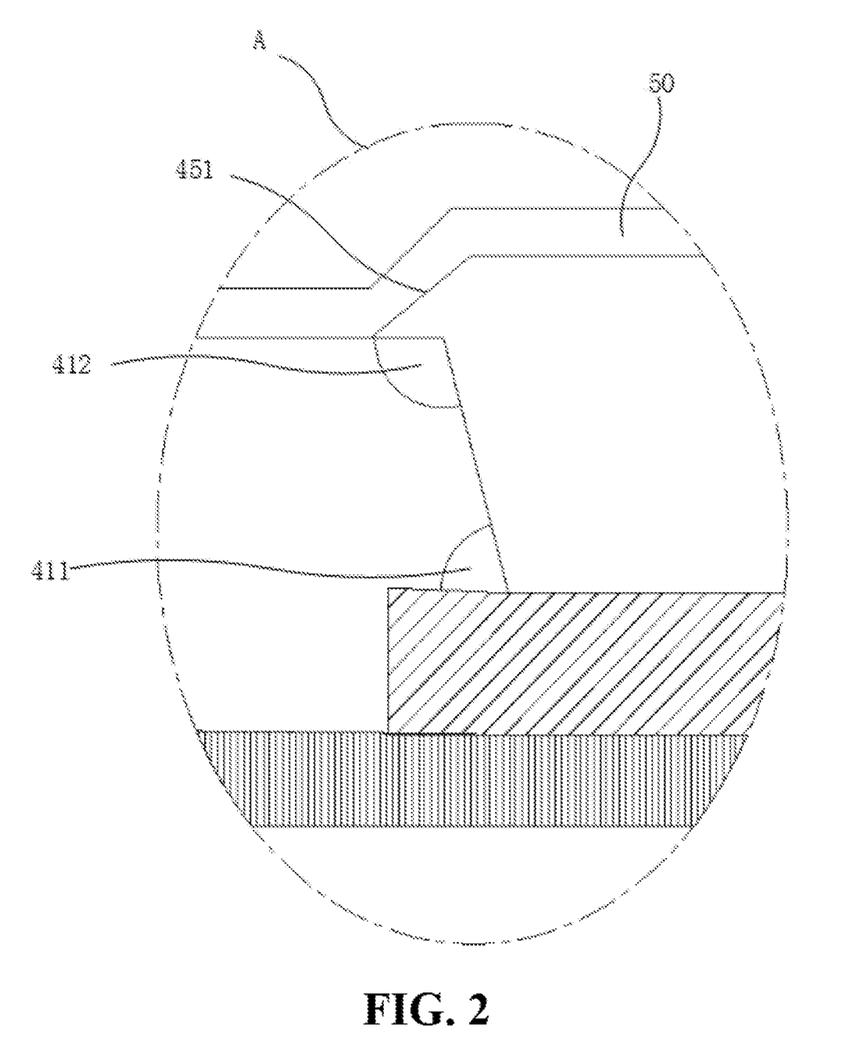
FIG. 2 is a local schematic diagram of a display panel according to the present application.
Figure 3:
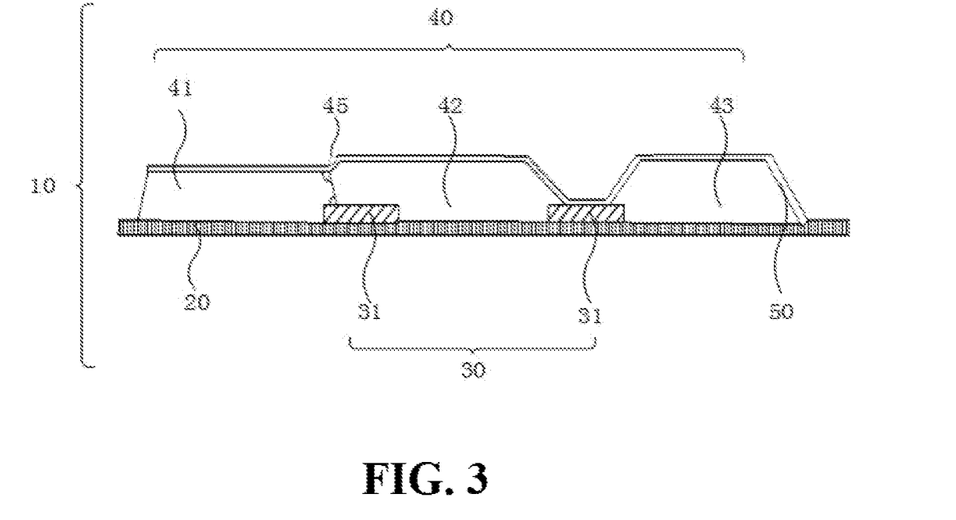
FIG. 3 is a schematic diagram (2) of a display panel according to the present application.
Figure 4:
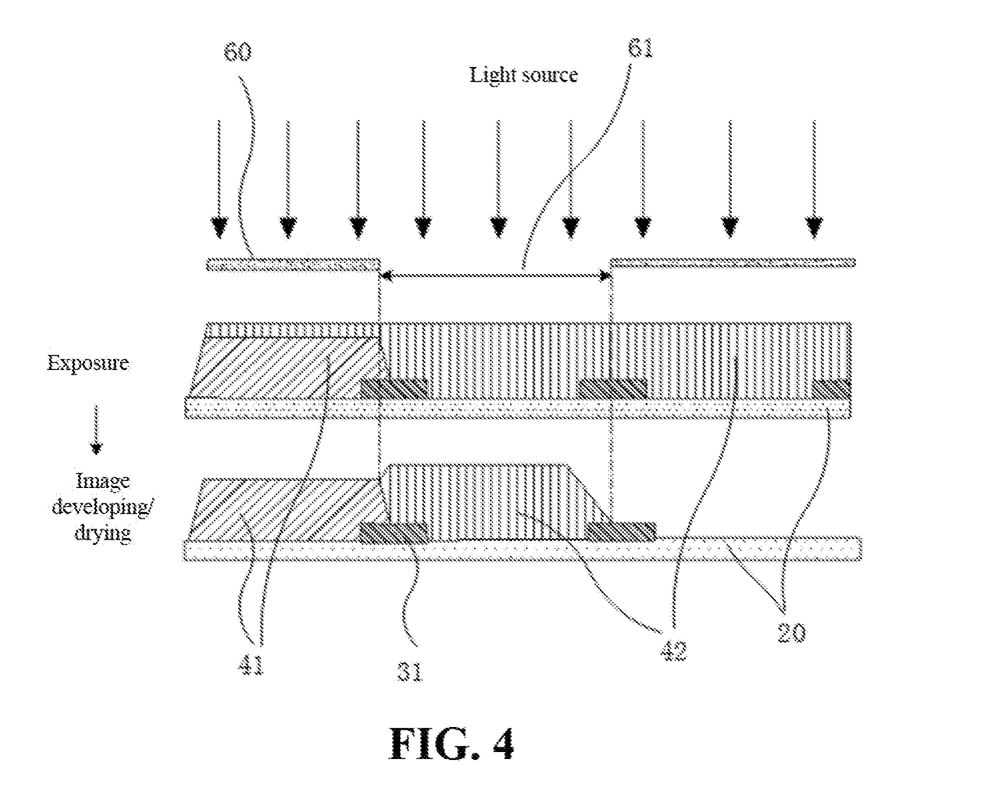
FIG. 4 is a schematic diagram of color filter stacking according to the present application.
Figure 5:
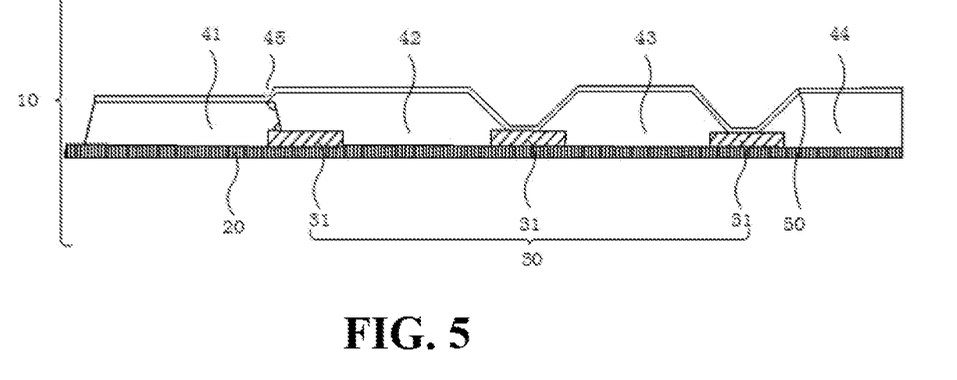
FIG. 5 is a schematic diagram (3) of a display panel according to the present application.

In addition, each of the stacked portions 45 is designed via a conventional mask 60. After a pattern of the first color filter 41 is made, the second color filter 41 is deposited, an opening 61 is provided on the conventional mask 60, one side of the opening 61 corresponds to the obtuse angle 412 turning place of the first color filter 41, and the other side of the opening 61 corresponds to a sharp angle 411 turning place, far away from the first color filter 41, of the second color filter 42; and after exposure and image developing, the second color filter 42 partially stacked with the first color filter 41 is obtained. With such a design, it may be assured that the first color filter 41 and the second color filter 42 are not affected by stacking, and the stacked portion 45 covers the obtuse angle 412 turning place of the first color filter 41.

In one or more embodiments, the color filters include a red color filter, a green color filter and a blue color filter; the first color filter 41 includes any one of the red color filter, the green color filter and the blue color filter; the second color filter 42 includes any one of the red color filter, the green color filter and the blue color filter, and is matched with the first color filter 41; and the third color filter 43 includes any one of the red color filter, the green color filter and the blue color filter, and is matched with the first color filter 41 and the second color filter 42.

Of course, the first color filter 41, the second color filter 42 and the third color filter 43 may further be any one of a white color filter or a yellow color filter.

Color filters on spaces formed between adjacent black matrixes 31 are different in color. However, the color is one of red, green, white and yellow original colors, all of which are used for displaying different colors. The first color filter 41, the second color filter 42 and the third color filter 43 represent a group of adjacent color filters having different colors.

As shown in FIG. 1 to FIG. 5, the present application further provides a display panel 2, which includes a first substrate 10; the first substrate 10 includes: a base 20; a black shading layer 30, located on the base 20, the black shading layer 30 including a plurality of black matrixes 31; a color photoresist layer 40, located on the black shading layer 30; and a film conductive layer, located on the color photoresist layer 40; the color photoresist layer 40 includes a plurality of color filters; and the color filters at least include a first color filter 41 and a second color filter 42 that are stacked partially.

Specifically, the first substrate 10 is a color film substrate in general, and may also be an array substrate under a GOA technology.

The first color filter 41 and the second color filter 42 are partially stacked, so that a difference between the first color filter 41 and the second color filter 42 becomes small, and when the transparent conductive film 50 is deposited on the first color filter 41 and the second color filter 42, a line breaking condition of the transparent conductive film 50 is reduced, and thus the line breaking condition of the transparent conductive film 50 is improved, and the yield of the display panel 2 is increased; and on the other hand, since adjacent color filters are partially overlapped, the formation of a groove is prevented, and thus the presence of the foreign particles is prevented and the yield of the display panel 2 is improved.

In one or more embodiments, the color filters further include a third color filter 43 and a fourth color filter 44; an angle of a sharp angle 411 of the first color filter 41 is greater than an angle of a sharp angle 411 of each of the second color filter 42, the third color filter 43 and the fourth color filter 44; each of the color filters at least includes a stacked portion 45; and one stacked portion 45 is stacked on the first color filter 41 by a side portion, close to the first color filter 41, of the second color filter 42.

In this solution, during a deposition process of the transparent conductive film 50, when an angle of a sharp angle 411 of each of the color filters is large, a side slope of each of the color filters is steep and the transparent conductive film 50 breaks a line more easily. Therefore, only color filters with large sharp angles 411 are stacked partially, and color filters with small sharp angles 411 are not stacked.

Only when the sharp angle 411 of the first color filter 41 is large is a stacked portion 45 provided between the first color filter 41 and the second color filter 42. When sharp angles 411 of two color filters in the first color filter 41, the second color filter 42 and the third color filter 43 are large, two stacked portions 45 may be disposed between the first color filter 41 and the second color filter 42 as well as between the second color filter 42 and the third color filter 43; and when sharp angles 411 of three color filters in the first color filter 41, the second color filter 42, the third color filter 43 and the fourth color filter 44 are large, three stacked portions 45 may be respectively disposed at adjacent positions of the first color filter 41, the second color filter 42, the third color filter 43 and the fourth color filter 44.

Specifically, each of the sharp angles 411 is an included angle formed by a side of each of the color filters and an upper surface of each of the black matrixes 31. Each of the stacked portions 45 is located on each of the black matrixes 31. Each of the black matrixes 31 takes a shading effect, so that the one stacked portion 45 may be prevented from affecting the first color filter 41 or the second color filter 42 to appear color mixing to affect the display effect.

In one or more embodiments, the sharp angle 411 of the first color filter 41 is greater than or equal to 600.

In this solution, it is found by a research that when the sharp angle 411 of each of the color filters is greater than 60°, the line breaking condition of the transparent conductive film 50 is easily occurred. Therefore, the first color filter 41 needs to be partially stacked.

In one or more embodiments, each of the color filters includes a plurality of obtuse angles 412 formed into a supplementary angle with each of the sharp angles 411; and each of the stacked portions 45 is formed at an obtuse angle 412 of which the angle is smaller than or equal to 120°.

In this solution, when each of the sharp angles 411 is greater than or equal to 60°, the transparent conductive film 50 breaks the line easily, and the line breaking place is the obtuse angle 412 of each of the color filters. At this moment, each of the obtuse angles 412 is smaller than or equal to 120°. By providing each of the stacked portions 45 at each of the obtuse angles 412, the drawback at each of the stacked portions 45 may be eliminated, and thus the line breaking probability of the transparent conductive film 50 at each of the obtuse angles 412 is reduced.

Specifically, each of the obtuse angles 412 is an included angle formed by an upper surface and the side of each of the color filters.

In one or more embodiments, a tail portion 451 of the one stacked portion 45 is stretched across an obtuse angle 412 turning place of the first color filter 41.

The tail portion 451 of the one stacked portion 45 is the side, stacked on the first color filter 41, of the second color filter 42. The side slope is gentle, and the tail portion 451 is stretched across the obtuse angle 412 turning place of the first color filter 41. By replacing the obtuse angle 412 with a gentle slope surface, the transparent conductive film 50 does not contact the obtuse angle 412 turning place of the first color filter 41 during deposition but is deposited on the gentle side of the second color filter 42.

Specifically, the tail portion 451 is a side portion, stacked on the first color filter 41, of the second color filter 42.

In addition, each of the stacked portions 45 is designed via a conventional mask 60. After a pattern of the first color filter 41 is made, the second color filter 41 is deposited, an opening 61 is provided on the conventional mask 60, one side of the opening 61 corresponds to the obtuse angle 412 turning place of the first color filter 41, and the other side of the opening 61 corresponds to a sharp angle 411 turning place, far away from the first color filter 41, of the second color filter 42; and after exposure and image developing, the second color filter 42 partially stacked with the first color filter 41 is obtained. With such a design, it may be assured that the first color filter 41 and the second color filter 42 are not affected by stacking, and the stacked portion 45 covers the obtuse angle 412 turning place of the first color filter 41.

Optionally, the color filters include a red color filter, a green color filter and a blue color filter; the first color filter 41 includes any one of the red color filter, the green color filter and the blue color filter; the second color filter 42 includes any one of the red color filter, the green color filter and the blue color filter, and is matched with the first color filter 41; the third color filter 43 includes any one of the red color filter, the green color filter and the blue color filter, and is matched with the first color filter 41 and the second color filter 42; and the fourth color filter 44 includes any one of the red color filter, the green color filter and the blue color filter, and is matched with the first color filter 41, the second color filter 42 and the third color filter 43.

Of course, the first color filter 41, the second color filter 42, the third color filter 43 and the fourth color filter 44 may further be any one of a white color filter or a yellow color filter.

Color filters on spaces formed between adjacent black matrixes 31 are different in color. However, the color is one of red, green, white and yellow original colors, all of which are used for displaying different colors. The first color filter 41, the second color filter 42, the third color filter 43 and the fourth color filter 44 represent a group of adjacent color filters having different colors.

A difference with the above embodiment is that each of the color filters only include one stacked portion 45.

In this solution, with the stacked portions 45, the line breaking problems of color filters with the steeper side slopes are solved. In a case where all color filters are stacked, the procedures of a manufacturing process of the display panel 2 are increased, the manufacturing time of the display panel 2 is prolonged, and the yield is reduced.

Referring to FIG. 1 to FIG. 4 and FIG. 6, the present application provides a display panel 2, which includes a first substrate 10; the first substrate 10 includes: a base 20; a black shading layer 30, located on the base 20, the black shading layer 30 including a plurality of black matrixes 31; a color photoresist layer 40, located on the black shading layer 30; and a film conductive layer, located on the color photoresist layer 40; the color photoresist layer 40 includes a plurality of color filters; the color filters further include a third color filter 43; an angle of a sharp angle 411 of the first color filter 41 is greater than an angle of a sharp angle 411 of each of the second color filter 42 and the third color filter 43; each of the sharp angles 411 is an included angle formed by a side of each of the color filters and an upper surface of each of the black matrixes 31; each of the color filters at least includes a stacked portion 45; one stacked portion 45 is stacked on the first color filter 41 by a side portion, close to the first color filter 41, of the second color filter 42; the sharp angle 411 of the first color filter 41 is greater than or equal to 60°; each of the color filters includes a plurality of obtuse angles 412 formed into a supplementary angle with each of the sharp angles 411; each of the stacked portions 45 is formed at an obtuse angle 412 of which the angle is smaller than or equal to 120°; each of the obtuse angles 412 is an included angle formed by an upper surface and the side of each of the color filters; a tail portion 451 of the one stacked portion 45 is stretched across an obtuse angle 412 turning place of the first color filter 41; and the tail portion 451 is a side portion, stacked on the first color filter 41, of the second color filter 42.

Generally, when the display panel 2 is designed, different black matrixes 31 on the base 20 are space-apart, and a space is respectively included between adjacent two black matrixes 31; after the color filters are exposed, the color filters above the spaces are kept and a part of the color filters are on the black matrixes 31; and different color filters are not overlapped, and the transparent conductive film 50 is deposited on a surface of the color photoresist layer 40, The included angle formed by the side of each of the color filters and the upper surface of each of the black matrixes 31 is the sharp angle 411, and the included angle formed between the upper surface and the side of each of the color filters is the obtuse angle 412. When the sharp angle 411 of each of the color filters is greater than or equal to 60°, the obtuse angle 412 of each of the color filters is smaller than or equal to 120° and a side slope of each of the color filters is steep; and thus, the line breaking condition of the transparent conductive film 50 at the obtuse angle 412 of each of the color filters is easily occurred to affect normal display of the display panel 2; and moreover, a groove is formed between adjacent color filters on each of the black matrixes 31 and some foreign particles are easily hidden in the grooves, so that the yield of the display panel 2 is affected. In the present application, by partially stacking the second color filter 42 of which the sharp angle 411 is smaller than 60° and the obtuse angle 412 is greater than 120° on the first color filter 41 of which the sharp angle 411 is greater than or equal to 60° and the obtuse angle 412 is smaller than or equal to 120°, and stacking the side portion of the second color filter 42 at the obtuse angle 412 turning place of the first color filter 41, the difference between the first color filter 41 and the second color filter 42 becomes small, so that the line breaking condition is not easily occurred when the transparent conductive film 50 is deposited on the color filters; and moreover, since formulation of a groove between the first color filter 41 and the second color filter 42 is prevented, the foreign particles are prevented from being hidden, and the yield of the display panel 2 is improved.

In a case where the sharp angle 411 of the third color filter 43 is also greater than 60°, while the stacked portion 45 is disposed between the first color filter 41 and the second color filter 42, another stacked portion 45 may also be disposed between the second color filter 42 and the third color filter 43; the side portion, close to the third color filter, of the second color filter 42 with a gentle side slope is stacked on the third color filter 43 and covers a side of the third color filter 43; and therefore, a difference between the second color filter 42 and the third color filter 43 is reduced, and the occurrence probability of line breaking when the transparent conductive film 50 is deposited at an adjacent position of the second color filter 42 and the third color filter 43 is reduced.

Specifically, the first substrate 10 is a color film substrate in general, and may also be an array substrate under a GOA technology.

Specifically, the color filters include a red color filter, a green color filter and a blue color filter; the first color filter 41 includes any one of the red color filter, the green color filter and the blue color filter; the second color filter 42 includes any one of the red color filter, the green color filter and the blue color filter, and is matched with the first color filter 41; and the third color filter 43 includes any one of the red color filter, the green color filter and the blue color filter, and is matched with the first color filter 41 and the second color filter 42.

Of course, the first color filter 41, the second color filter 42 and the third color filter 43 may further be any one of a white color filter or a yellow color filter.

Color filters on spaces formed between adjacent black matrixes 31 are different in color. However, the color is one of red, green, white and yellow original colors, all of which are used for displaying different colors. The first color filter 41, the second color filter 42 and the third color filter 43 represent a group of adjacent color filters having different colors.

In addition, each of the stacked portions 45 is designed via a conventional mask 60. After a pattern of the first color filter 41 is made, the second color filter 41 is deposited, an opening 61 is provided on the conventional mask 60, one side of the opening 61 corresponds to the obtuse angle 412 turning place of the first color filter 41, and the other side of the opening 61 corresponds to a sharp angle 411 turning place, far away from the first color filter 41, of the second color filter 42; and after exposure and image developing, the second color filter 42 partially stacked with the first color filter 41 is obtained. With such a design, it may be assured that the first color filter 41 and the second color filter 42 are not affected by stacking, and the stacked portion 45 covers the obtuse angle 412 turning place of the first color filter 41.

Figure 6:
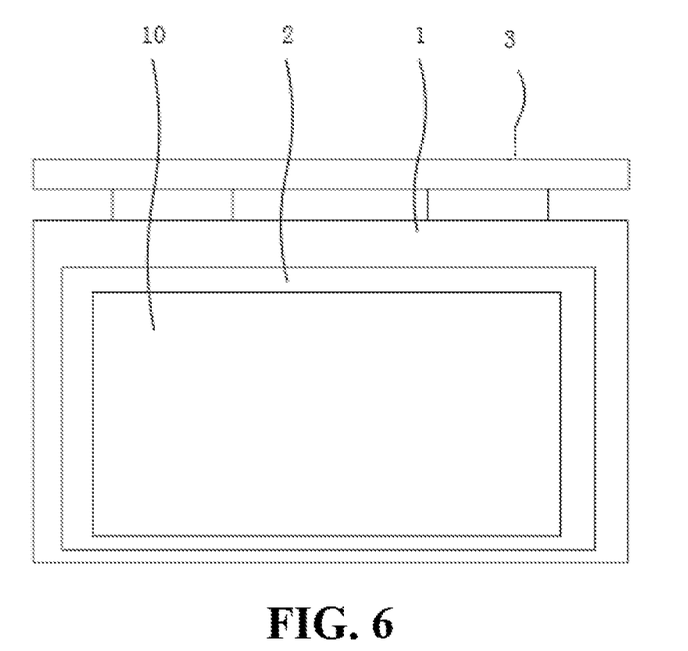
FIG. 6 is a schematic diagram of a display apparatus according to the present application.

As another embodiment of the present application, referring to FIG. 6, the present application discloses a display apparatus 1, which includes the above-mentioned any one display panel 2 and a drive circuit 3 configured to drive the display panel 2.

In the present application, the display panel may be a Twisted Nematic (TN) panel, an In-Plane Switching (IPS) panel, a Multi-domain Vertical Alignment (VA) panel, and of source, may also be other types of appropriate panels.

The above are further detailed descriptions of the present application in combination with specific optional implementation manners and should not be deemed as that the specific implementation of the present application is only limited to these descriptions. A person of ordinary skill in the art to which the present application belongs may further make a plurality of simple deviations or replacements without departing from the concept of the present application and all should be considered as the scope of protection of the present application.

What is claimed is:

1. A display panel, comprising a first substrate, the first substrate comprises:
   a base;
   a black shading layer, disposed on the base, the black shading layer comprises a plurality of black matrixes;
   a color photoresist layer, disposed on the black shading layer; and
   a transparent conductive film, disposed on the color photoresist layer;
   wherein the color photoresist layer comprises a plurality of color filters; and the color filters at least comprise a first color filter and a second color filter that are stacked partially;
   wherein the plurality of color filters further comprise a third color filter; an acute angle of the first color filter is greater than an acute angle of each of the second color filter and the third color filter; and
   wherein the plurality of color filters comprise at least one stacked portion, which is stacked on the first color filter by a side portion of the second color filter adjacent to the first color filter.

2. The display panel according to claim 1, wherein a portion where the first color filter and the second color filter are stacked is disposed on a corresponding black matrix.

3. The display panel according to claim 1, wherein a height of the second color filter is greater than a height of the first color filter.

4. The display panel according to claim 3, wherein the plurality of color filters comprise one and only one stacked portion.

5. The display panel according to claim 1, wherein the color filters further comprise a fourth color filter; an acute angle of the first color filter is greater than an acute angle of each of the second color filter, the third color filter and the fourth color filter.

6. The display panel according to claim 5, wherein each of the acute angles of the first through fourth color filters is an included angle formed by a side of each of the first through fourth color filters and an upper surface of the corresponding black matrix.

7. The display panel according to claim 5, wherein the acute angle of the first color filter is greater than or equal to 60°.

8. The display panel according to claim 5, wherein each of the first through fourth color filters comprises an obtuse angle which forms a pair of supplementary angles in conjunction with the acute angle of the color filter.

9. The display panel according to claim 8, wherein each of the at least one stacked portion is formed at an obtuse angle which is smaller than or equal to 120°.

10. The display panel according to claim 9, wherein each of the obtuse angles is an included angle formed by an upper surface and the side of the corresponding color filter.

11. The display panel according to claim 9, wherein a tail portion of the at least one stacked portion is stretched across an obtuse angle turning place of the first color filter.

12. The display panel according to claim 11, wherein the tail portion of the at least one stacked portion is a side portion, stacked on the first color filter, of the second color filter.

13. The display panel according to claim 5, wherein the color filters comprise a red color filter, a green color filter and a blue color filter; the first color filter comprises any one of the red color filter, the green color filter and the blue color filter; the second color filter comprises any one of the red color filter, the green color filter and the blue color filter, and is matched with the first color filter; the third color filter comprises any one of the red color filter, the green color filter and the blue color filter, and is matched with the first color filter and the second color filter; and the fourth color filter comprises any one of the red color filter, the green color filter and the blue color filter, and is matched with the first color filter, the second color filter and the third color filter.

14. The display panel according to claim 1, wherein the acute angle of the first color filter is greater than or equal to 60°.

15. A display panel, comprising a first substrate, the first substrate comprises:
   a base;
   a black shading layer, disposed on the base, the black shading layer comprises a plurality of black matrixes;
   a color photoresist layer, disposed on the black shading layer; and
   a transparent conductive film, disposed on the color photoresist layer;
   wherein the color photoresist layer comprises a plurality of color filters; the color filters at least comprises a first color filter and a second color filter that are stacked partially;
   wherein the plurality of color filters further comprise a third color filter; an acute angle of the first color filter is greater than an acute angle of each of the second color filter and the third color filter;
   wherein the plurality of color filters comprise at least one stacked portion, which is stacked on the first color filter by a side portion of the second color filter adjacent to the first color filter;
   the acute angle of the first color filter is greater than or equal to 60°;
   each of the first through fourth color filters comprises an obtuse angle which forms a pair of supplementary angles in conjunction with the acute angle of the color filter; each of the at least one stacked portion is formed at an obtuse angle which is smaller than or equal to 120°; and a tail portion of the at least one stacked portion is stretched across an obtuse angle turning place of the first color filter.

16. A display apparatus, comprising a display panel and a drive circuit configured to drive the display panel, the display panel comprises a first substrate, and the first substrate comprises:

a base;

a black shading layer, disposed on the base, the black shading layer comprises a plurality of black matrixes;

a color photoresist layer, disposed on the black shading layer; and a transparent conductive film, disposed on the color photoresist layer;

wherein the color photoresist layer comprises a plurality of color filters; and the color filters at least comprise a first color filter and a second color filter that are stacked partially;

wherein the plurality of color filters further comprise a third color filter; an acute angle of the first color filter is greater than an acute angle of each of the second color filter and the third color filter; and wherein the plurality of color filters comprise at least one stacked portion, which is stacked on the first color filter by a side portion of the second color filter adjacent to the first color filter.

\* \* \* \* \*